US012613729B1

(12) United States Patent
Kuperman

(10) Patent No.: US 12,613,729 B1
(45) Date of Patent: Apr. 28, 2026

(54) MAXIMIZING SPOT SAVINGS WITH LIVE MIGRATION AND PRE-PROVISIONED NODES

(71) Applicant: CAST AI Group, Inc., Miami, FL (US)

(72) Inventor: Leonid Kuperman, North York (CA)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 19/261,934

(22) Filed: Jul. 7, 2025

Related U.S. Application Data

(60) Provisional application No. 63/776,347, filed on Mar. 24, 2025.

(51) Int. Cl.
  G06F 9/455 (2018.01)
(52) U.S. Cl.
  CPC .. G06F 9/45558 (2013.01); *G06F 2009/4557* (2013.01)
(58) Field of Classification Search
  None
  See application file for complete search history.

(56) References Cited

U.S. PATENT DOCUMENTS

| | | | |
|---|---|---|---|
| 8,910,160 B1 * | 12/2014 | Patwardhan | ........ G06F 9/45558 |
| | | | 718/1 |
| 10,355,989 B1 | 7/2019 | Panchal et al. | |
| 11,089,105 B1 | 8/2021 | Karumbunathan et al. | |
| 11,159,366 B1 | 10/2021 | Gawade et al. | |

| | | | |
|---|---|---|---|
| 11,595,306 B2 | 2/2023 | Masnauskas et al. | |
| 2014/0365626 A1 * | 12/2014 | Radhakrishnan | ... G06F 9/45558 |
| | | | 709/222 |
| 2015/0058863 A1 * | 2/2015 | Karamanolis | ......... G06F 9/5083 |
| | | | 718/105 |
| 2015/0154056 A1 * | 6/2015 | Chen | .................... G06F 9/4856 |
| | | | 718/103 |
| 2016/0127454 A1 | 5/2016 | Maheshwari et al. | |
| 2016/0323184 A1 | 11/2016 | Li et al. | |

(Continued)

OTHER PUBLICATIONS

U.S. Appl. No. 19/080,682, filed Mar. 14, 2025, Inventors Mantas Cepulkovskis, Valdas Rakutis and Laurynas Stasys.

(Continued)

*Primary Examiner* — Wynuel S Aquino
(74) *Attorney, Agent, or Firm* — Fenwick & West LLP

(57) ABSTRACT

A system or method for maintaining high availability of containerized workloads in a cloud environment utilizing spot instances. The system provisions multiple spot instances based on corresponding node templates and instantiates production workloads on these spot instances. For each node template, a mirrored standby node template is generated, and on-demand instances are provisioned as standby nodes accordingly. Dummy workloads are instantiated on the on-demand instances, each pre-pulling a container image and reserving compute resources for a corresponding production workload. The system continuously monitors for interruptions of spot instances running production workloads. In response to detecting such an interruption, the system maps the affected production workload to a corresponding dummy workload on a standby node and migrates the production workload to the standby node.

20 Claims, 9 Drawing Sheets

(56)     References Cited

U.S. PATENT DOCUMENTS

| 2017/0257439 | A1  | 9/2017  | Wang et al. |  |
| 2019/0319892 | A1  | 10/2019 | Ganguli et al. |  |
| 2019/0356609 | A1  | 11/2019 | Grunwald et al. |  |
| 2020/0099659 | A1  | 3/2020  | Cometto et al. |  |
| 2020/0241907 | A1* | 7/2020  | Dornemann | ........ G06F 11/2097 |
| 2020/0278892 | A1  | 9/2020  | Nainar et al. |  |
| 2020/0296026 | A1  | 9/2020  | Michael et al. |  |
| 2021/0019194 | A1  | 1/2021  | Bahl et al. |  |
| 2021/0049029 | A1* | 2/2021  | Kumble | .............. G06F 9/45558 |
| 2021/0064438 | A1* | 3/2021  | Zhou | ..................... G06F 9/5072 |
| 2023/0131050 | A1* | 4/2023  | Shemer | .............. G06F 9/45558 |
|  |  |  |  | 718/104 |

OTHER PUBLICATIONS

U.S. Appl. No. 19/094,518, filed Mar. 28, 2025, Inventors Saulius Mašnauskas, Valdas Rakutis, Jan Sykora and Ivaylo Papratilov.

* cited by examiner

300

| Original Workload | Original Replicas | Dummy Pod Replicas (10%) | CPU Requests (per pod) | Memory Requests (per pod) |
|---|---|---|---|---|
| Nginx | 20 | 2 | 100m | 128Mi |
| Backend Service A | 30 | 3 | 500m | 512Mi |
| Backend Service B | 60 | 6 | 250m | 256Mi |
| Redis Service | 1 | 1 (rounded up) | 1000m (1 CPU) | 2Gi |
| Postgres Service | 1 | 1 (rounded up) | 1000m (1 CPU) | 4Gi |

510 Initiate Return to Spot Capacity

520 Create Dummy Pods Targeting Spot Nodes

530 Wait Until Dummy Pods are Ready

540 Temporarily Lock Spot Nodes via Taint

550 Delete Dummy Pods to Free Resources

560 Migrate Actual Workloads to Spot Nodes

570 Remove Temporary Node Locks

580 Workloads Successfully Returned to Spot Capacity

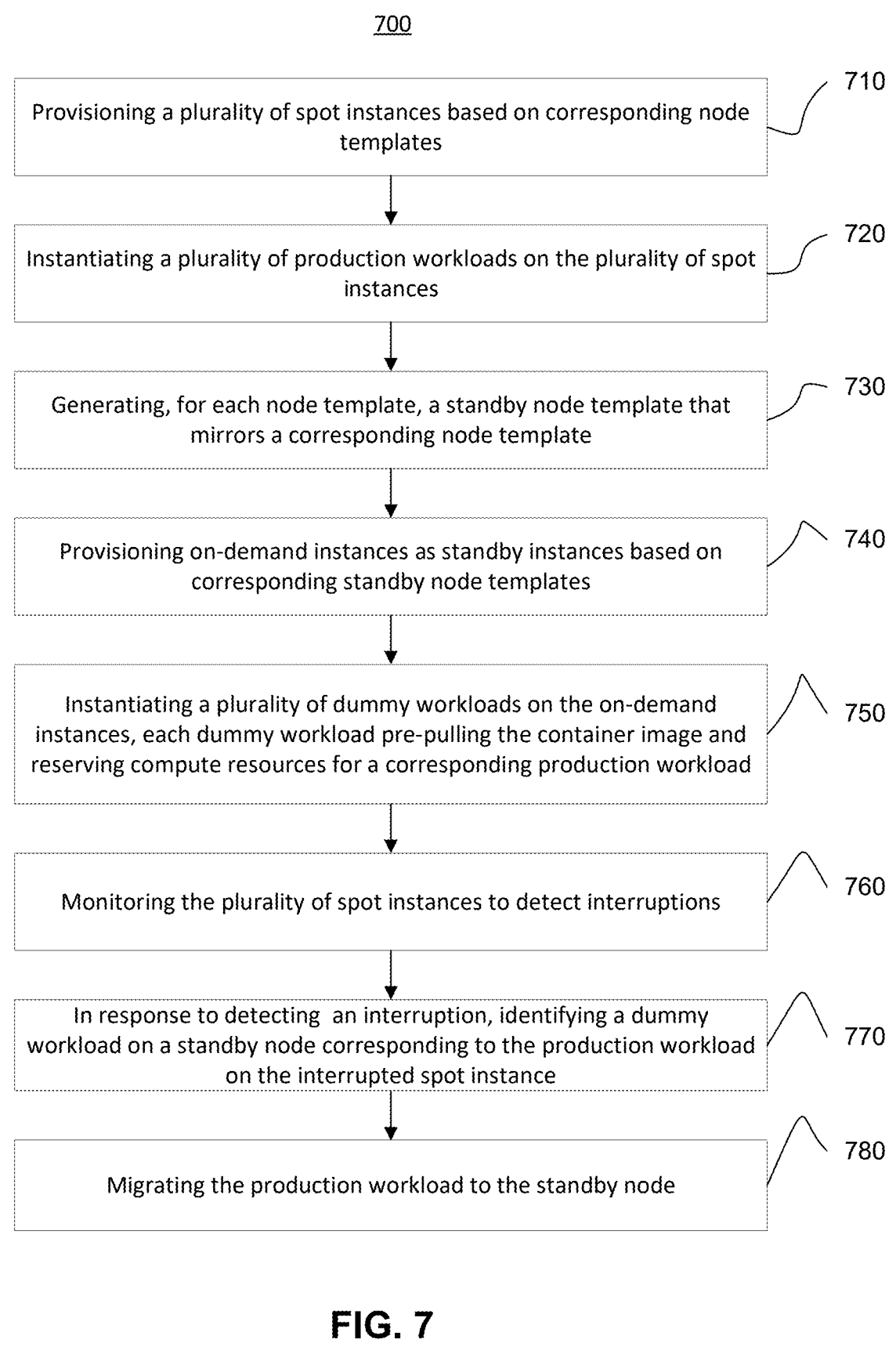

700

Provisioning a plurality of spot instances based on corresponding node templates ⟋ 710

↓

Instantiating a plurality of production workloads on the plurality of spot instances ⟋ 720

↓

Generating, for each node template, a standby node template that mirrors a corresponding node template ⟋ 730

↓

Provisioning on-demand instances as standby instances based on corresponding standby node templates ⟋ 740

↓

Instantiating a plurality of dummy workloads on the on-demand instances, each dummy workload pre-pulling the container image and reserving compute resources for a corresponding production workload ⟋ 750

↓

Monitoring the plurality of spot instances to detect interruptions ⟋ 760

↓

In response to detecting an interruption, identifying a dummy workload on a standby node corresponding to the production workload on the interrupted spot instance ⟋ 770

↓

Migrating the production workload to the standby node ⟋ 780

FIG. 7

MAXIMIZING SPOT SAVINGS WITH LIVE MIGRATION AND PRE-PROVISIONED NODES

CROSS-REFERENCE TO RELATED APPLICATION

This application claims the benefit of, and priority to, U.S. Provisional Patent Application No. 63/776,347, filed on Mar. 24, 2025, which is incorporated herein by reference in its entirety.

TECHNICAL FIELD

This disclosure relates generally to cloud computing, and more specifically maximizing usage of spot instances with live migration and pre-provisioned on-demand instances.

BACKGROUND

Modern cloud providers offer spot instances that can be reclaimed by the provider at any moment, often with only a two-minute termination notice. Workloads that lack built-in checkpointing—such as long-running (e.g., MATLAB) computations—must restart from the beginning if an interruption occurs, so operators frequently avoid spot instances for these applications despite their otherwise attractive characteristics.

Attempting to launch replacement nodes after the termination notice is typically unsuccessful because creating a new virtual machine and pulling the required container images can introduce delays of over a minute, leaving insufficient time to move the workload before the original node shuts down. Earlier efforts to keep spare capacity available—such as powering on virtual machines and then pausing them—proved operationally complex while providing only marginal improvement.

When fallback nodes do exist, generic Kubernetes eviction supplies only best-effort placement. Multiple pods may contend for the same destination node, producing scheduling races and potential service disruption.

Consequently, existing systems force operators to choose between (i) accepting service interruptions caused by reclaimed spot instances or (ii) maintaining large pools of always-running on-demand instances with their attendant management overhead.

SUMMARY

Embodiments described herein include a method or system that addresses the above-described issues by maintaining a minimal, pre-provisioned standby pool with dummy workloads and dynamic resource management, enabling rapid and reliable failover of production workloads in response to spot interruptions.

In some embodiments, the system provisions multiple spot instances based on corresponding node templates, and instantiates multiple production workloads on the multiple spot instances. The system generates, for each node template, a standby node template that mirrors a corresponding node template and provisions one or more on-demand instances as standby instances based on corresponding standby node templates. The system instantiates multiple dummy workloads on the on-demand instances. Each dummy workload pre-pulls a container image and reserves compute resources for a corresponding production workload. The system monitors the spot instances to detect interruptions. In response to detecting an interruption of a spot instance that runs a production workload, the system identifies a dummy workload on a standby node that corresponds to the production workload on the interrupted spot instance, and migrates the production workload to the standby node.

BRIEF DESCRIPTION OF THE DRAWINGS

FIG. 3 is a table that shows mapping of various workloads and their associated dummy pod replicas within a standby pool, in accordance with one or more embodiments.

FIG. 7 is a flowchart of a method for live migration with mirrored standby pool and dummy pods, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In container-orchestrated cloud environments, spot instances may be reclaimed by the provider with only a two-minute termination notice. Stateful or long-running workloads-such as MATLAB computations-lack internal checkpointing and therefore lose all progress if not relocated before the instance shuts down, forcing operators to avoid spot capacity for these jobs. Launching a replacement node and downloading the required container image typically consumes more than a minute, exhausting most of the notice period and still leaving the migration itself undone. Prior attempts to keep spare capacity by powering on and pausing virtual machines introduced operational complexity with only limited benefit. Moreover, conventional Kubernetes eviction performs best-effort scheduling; multiple pods contend for the same destination, producing race conditions. Accordingly, existing systems fail to effectively maintain service continuity when spot instances are reclaimed.

The embodiments described herein address these deficiencies by maintaining a minimal pool of on-demand standby nodes that are automatically generated as mirrored versions of the primary spot node templates and marked with a dedicated temporary lock, such that ordinary workloads do not land there inadvertently. Each standby node hosts one or more "dummy pods" that exactly mirror the resource requests and scheduling constraints of the corresponding production pods while pre-pulling the identical container image, thereby eliminating image-download latency during fail-over. When a spot interruption is predicted or detected, the system performs a scheduling check and applies a temporary lock to the selected destination node; if no suitable spot node exists, it locates the matching dummy pod, deletes it to free the reserved resources, and live-migrates the workload to the standby node-completing the transfer within a short window and without service disruption. After spot capacity stabilizes, the same dummy-pod technique is used to return the workload to spot nodes. Continuous bin-packing and rebalancing compact the dummy pods, while a prediction model dynamically adjusts the standby-pool size so that only the minimum necessary compute resources are held in reserve.

Additional details about the system are further described below with respect to FIGS. 1-7.

System Architecture

Figure 1:
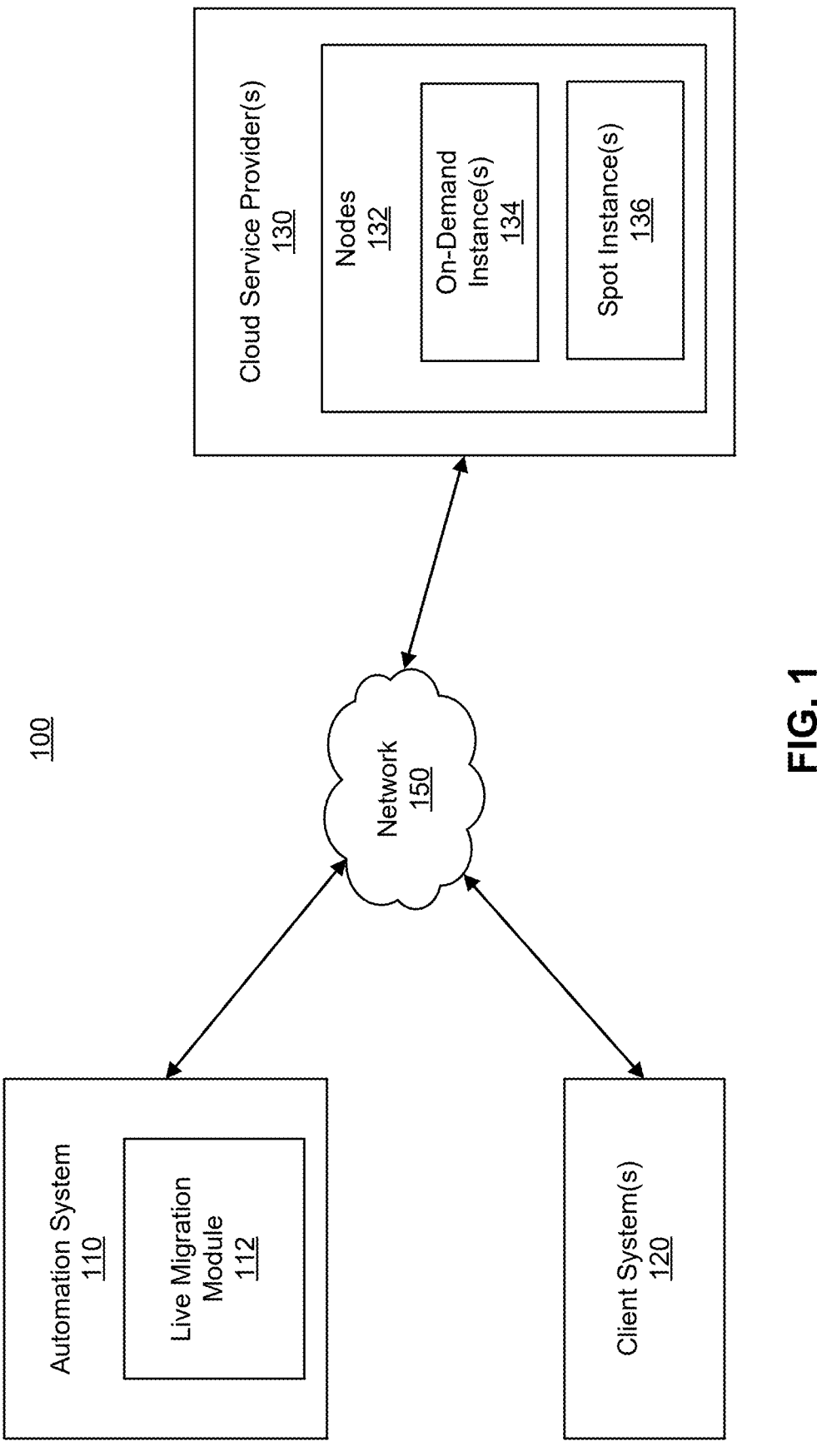
FIG. 1 is a block diagram of a system environment in which an automation system may be implemented, in accordance with one or more embodiments.

FIG. 1 is a block diagram of a system environment 100 in which an automation system 110 (also referred to "the system") may be implemented in accordance with one or more embodiments. The environment 100 includes the automation system 110, one or more client devices 120, and one or more cloud service provider(s) 130, interconnected via a network 150. The cloud service provider(s) 130 host one or more nodes 132, which may be virtual machines (VMs). The cloud service provider(s) 130 may include (but are not limited to) Amazon Web Services (AWS)®, Google Cloud Platform (GCP)®, and/or Microsoft Azure®. The cloud service provider 130 provides computing resources, such as VMs, storage, and networking, over the network 150. VMs are scalable, software-based representations of physical machines that can run operating systems and applications. Networking includes virtualized network components, such as firewalls, and virtual private networks (VPNs). These resources may be made available to users on-demand, enabling flexibility and scalability. In some embodiments, the nodes 132 are part of a Kubernetes cluster, which is a distributed system for managing containerized applications across multiple VMs. Additional details about clusters, Kubernetes services, and cloud service providers (CSPs) are described in U.S. patent application Ser. No. 17/380,729, filed Jul. 20, 2021 (now issued as U.S. Pat. No. 11,595,306), which is incorporated herein in its entirety.

The nodes 132 include on-demand instances 134 (also referred to as on-demand nodes) and spot instances 136 (also referred to as spot nodes). On-demand instances 134 are virtual machine resources provisioned by a cloud provider that are available for use at any time and remain active until explicitly terminated by the user. These instances offer predictable availability and are not subject to involuntary interruption by the provider, making them suitable for workloads requiring consistent uptime and reliability. In contrast, spot instances 136 are virtual machine resources that utilize excess cloud capacity and are offered at a lower priority. While spot instances 136 can provide access to substantial compute resources, they may be interrupted and reclaimed by the cloud provider with little notice, typically when demand for resources increases or higher-priority workloads require capacity. As a result, spot instances 136 are well-suited for flexible, interruption-tolerant workloads, whereas on-demand instances 134 are preferred for or stateful applications that cannot tolerate unexpected termination.

Entities often want to maximize spot instance utilization because spot instances 136 provide access to the same compute resources as on-demand instances but are available at significantly reduced rates due to their lower priority and interruptible nature. By leveraging spot instances 136 for as much of their workload as possible, organizations can achieve substantial improvements in resource efficiency and operational flexibility, enabling them to run large-scale or compute-intensive applications that might otherwise require more constrained use of on-demand infrastructure.

However, traditional systems typically rely on always-available on-demand or reserved instances to guarantee reliability, which limits the proportion of workloads that can be safely run on spot instances 136. These systems also do not provide automated, rapid failover or live migration capabilities, nor do they maintain a minimal, pre-provisioned standby pool that is ready to absorb workloads at a moment's notice. As a result, organizations are forced to restrict their use of spot instances 136 to only those workloads that can tolerate interruption, preventing them from fully leveraging the resource efficiency and flexibility that spot instances 136 can provide.

The automation system 110 described herein enables maximization of spot instance utilization by including a live migration module 112. The live migration module 112 maintains a pool of standby nodes, each prepared with dummy pods that reserve compute resources and pre-pull the necessary container images. The live migration module 112 is configured to detect when a spot instance 136 is scheduled for interruption and to orchestrate the transfer of running workloads from the affected spot instance 136 to a standby on-demand instance. By automating the migration process and ensuring that workloads are promptly and reliably relocated before the spot instance 136 is reclaimed, the live migration module 112 allows and stateful applications to benefit from spot instance 136 resources without experiencing service interruption. Additional details about the live migration module 112 and agents for determining network bandwidth metrics are further described below with respect to FIGS. 2-8.

The client device(s) 120 are computing systems associated with various entities. These entities include entities that can provision nodes 132 on the cloud service provider 130, as well as end-users who engage with applications deployed onto the nodes 132. The client devices 120 are also capable of receiving user input as well as transmitting and/or receiving data via the network 150. In one embodiment, a client device 120 is a computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate via the network 150. In one embodiment, a client device 120 executes an application allowing a user of the client device 120 to interact with the automation system 110. For example, the client device 120 may execute a customer mobile application to enable interaction between the client device 120 and the automation system 110 or the cloud service providers 130. As another example, a client device 120 executes a browser application to enable interaction between the client device 120 and the system 110 via the network 150. In another embodiment, a client device 120 interacts with the system 110 through an application programming interface (API) running on a native operating system of the client device 120, such as IOS® or ANDROID™.

The network 150 is configured to facilitate communications among the automation system 110, client device 120, and cloud service provider 130. The network 150 may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Example Architecture of Live Migration Module

Figure 2:
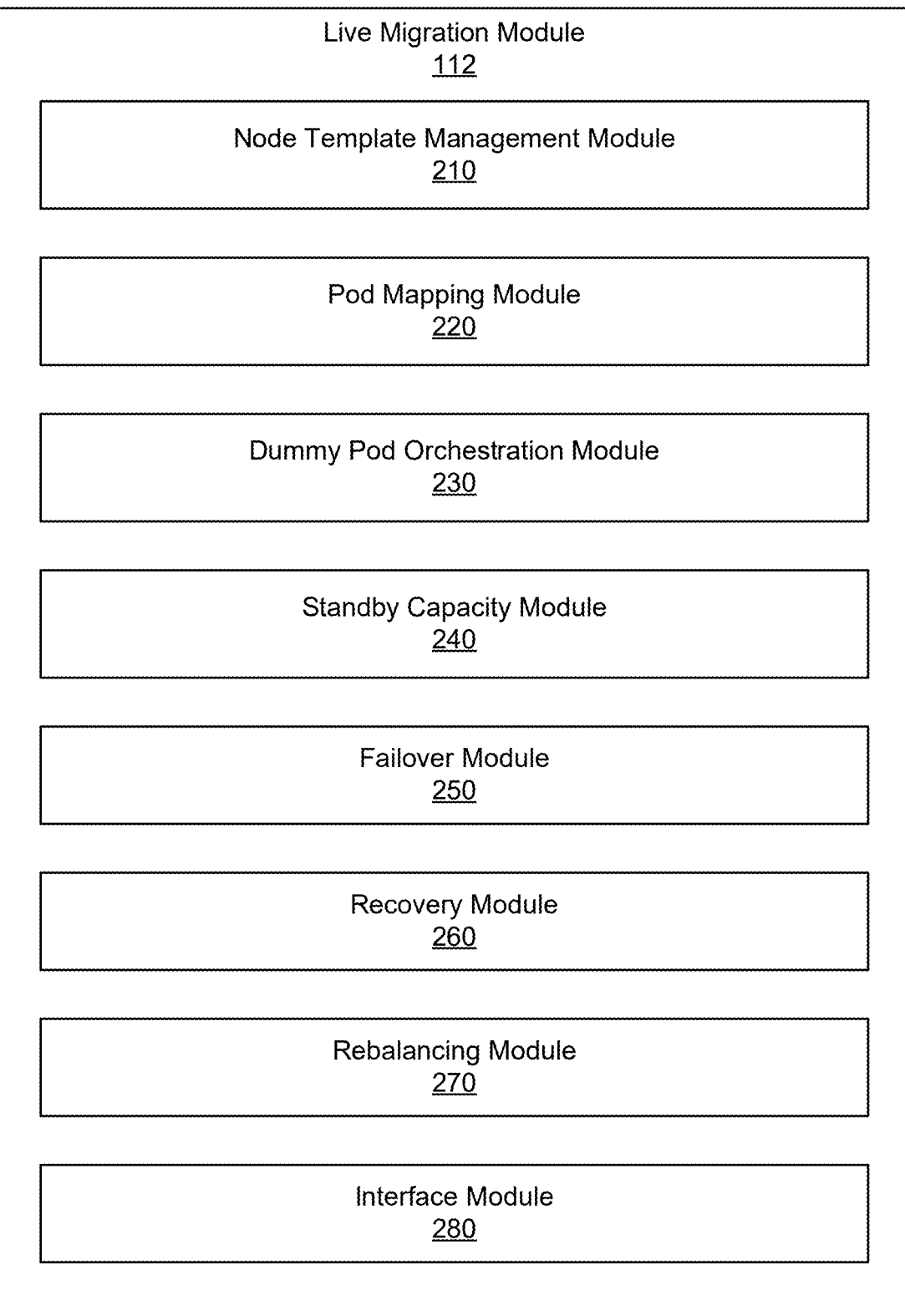
FIG. 2 illustrates an example architecture of a live migration module, in accordance with one or more embodiments.

FIG. 2 illustrates an example architecture of a live migration module 112, in accordance with one or more embodiments. The live migration module 112 includes a node template management module 210, a pod mapping module 220, a dummy pod orchestration module 230, a standby capacity module 240, a failover module 250, a recovery module 260, a rebalancing module 270, and an interface module 280. In some embodiments, the live migration module 112 may include more or fewer modules than those illustrated in FIG. 2. In some embodiments, functions of multiple modules may be integrated into a single module. Alternatively, functions of a single module may be distributed across multiple modules.

The node template management module 210 is configured to create, maintain, and update node templates that define the configuration and resource allocation for both spot and standby (on-demand) instances within the cluster. This module ensures that for every spot-backed node template, a mirrored standby node template is generated, matching the original configuration but provisioning on-demand instances and including a temporary lock (e.g., a taint) to prevent accidental scheduling of production workloads.

A taint is a configuration attribute applied to a node within a Kubernetes cluster that influences the scheduling behavior of pods. When a node is assigned a taint, it effectively signals to the Kubernetes scheduler that only pods with a matching toleration are permitted to be scheduled on that node. This mechanism may be used to control and restrict which workloads can run on specific nodes, thereby preventing unintended or unauthorized pods from being placed there.

In the context of the live migration module 112, taints are applied to standby (on-demand) nodes to ensure that only designated dummy pods or migrating production pods are allowed to utilize those resources, while ordinary workloads are excluded. This selective scheduling is advantageous for maintaining the integrity of the standby pool, enabling that reserved capacity remains available for failover or migration events, and preventing resource contention that could compromise high availability and operational continuity.

In some embodiments, the node template management module 210 dynamically adjusts these templates as workloads scale or shift, integrating with the dummy pod orchestration and pod mapping modules to reflect the current and desired state of the system. The node template management module 210 also manages the lifecycle of node templates, including the addition or removal of resources, and ensures that the templates are aligned with the operational requirements of the live migration and failover processes.

The pod mapping module 220 is configured to maintain a comprehensive mapping between original production pods and their corresponding dummy pods deployed on standby nodes. This mapping enables orchestrating migration workflows, as it allows the system to quickly identify which dummy pod should be deleted to free up resources for a migrating production pod during a spot interruption event. The pod mapping module 220 tracks attributes such as the number of original replicas, the number of dummy pod replicas (often a percentage of the original, e.g., 10%), and the specific resource requests (CPU, memory) for each pod. This mapping may be stored as annotations or labels on the pod specifications, such that the relationship is accessible and up to date. In some embodiments, the pod mapping module 220 interacts with the node template management module 210 and dummy pod orchestration module 230 to ensure that all mappings reflect the current state of the cluster, enabling rapid and accurate failover and recovery operations.

The dummy pod orchestration module 230 is configured to automate the creation, scaling, and removal of dummy pods on standby nodes. Dummy pods are lightweight placeholders that mirror the resource requirements, scheduling constraints, and container image specifications of their corresponding production pods. The dummy pod orchestration module 230 maintains a required number of dummy pod replicas—typically a percentage of the original workload, rounded up to ensure adequate coverage—and ensures that each dummy pod pre-pulls the necessary container image and reserves the appropriate compute resources. The dummy pod orchestration module 230 also manages the lifecycle of dummy pods, removing them when their resources are needed for migrating production pods and recreating them as needed to maintain standby readiness. By ensuring that standby nodes are prepared for migration, the dummy pod orchestration module 230 reduces delays associated with node provisioning and image pulls, supporting rapid failover.

The standby capacity module 240 is configured to manage the reservation and allocation of on-demand resources required to support failover from spot instances. The standby capacity module 240 determines an appropriate amount of standby capacity to provision, either as a fixed percentage set by the user or dynamically adjusted based on real-time usage, historical utilization, and prediction models. In some embodiments, the standby capacity module 240 continuously monitors the utilization of standby resources, ensuring that sufficient capacity is always available to accommodate potential migrations or recoveries. In some embodiments, the standby capacity module 240 also performs regular checks and risk assessments to verify that the configured standby pool can handle at least one node interruption and proactively alerts administrators if coverage gaps are detected. By working in tandem with the dummy pod orchestration module 230 and failover module 250, the standby capacity module 240 enables high availability and operational continuity, even in the face of unpredictable spot instance interruptions.

In some embodiments, the standby capacity module 240 includes a machine learning (ML) model trained to dynamically determine and adjust the percentage of standby capacity ($X$ %) to be provisioned for live migration and failover operations. In some embodiments, the ML model is trained using a variety of historical and real-time operational data, including, but not limited to, records of spot instance interruptions, resource utilization metrics, workload scaling events, and risk indicators associated with different node templates and cloud regions.

The ML model may receive as input historical data reflecting the frequency, timing, and duration of spot instance interruptions across multiple availability zones and instance types. This data enables the ML model to identify patterns and risk factors associated with spot instance volatility. In addition, the ML model may analyze historical and ongoing CPU and memory usage for both primary (spot) and standby (on-demand) resource pools, as well as workload scaling events such as changes in replica counts or resource requests. By incorporating these data sources, the ML model is able to model fluctuations in resource demand over time.

In some embodiments, the ML model further incorporates seasonality prediction, employing time-series analysis to identify recurring patterns or event-driven spikes in workload demand. The ML model may proactively increase the value of X % in anticipation of high-demand periods and reduce X % during periods of stability. Survival analysis techniques may also be employed to estimate the probability of spot instance interruptions, based on observed reliability metrics for different node templates and cloud regions. The ML model may further consider risk metrics, such as the number of nodes that could be lost without adequate standby coverage, to inform its recommendations.

In some embodiments, ML model is further configured to receive feedback from actual live migration and eviction events. As the system operates, outcomes of these events are recorded and used to refine the ML model's predictions. The ML model may gradually decrease X % as confidence in the system's ability to handle interruptions increases, or increase X % if additional standby capacity is required to maintain reliability.

In some embodiments, the ML model is continuously retrained and updated as new data becomes available, thereby enabling the system to adapt to changing cloud conditions, workload behaviors, and operational requirements. Through this data-driven and adaptive approach, the ML model ensures that the standby pool is provisioned at an optimal level, balancing resource efficiency with risk mitigation and supporting high availability and operational continuity in cloud-native environments. Additional details about ML-based resource prediction are described in U.S. patent application Ser. No. 19/080,682, filed Mar. 14, 2025, which is incorporated herein by reference in its entirety.

The failover module 250 is configured to monitor the health and status of spot instances and orchestrate the migration of production pods to standby nodes when interruptions are detected or predicted. In response to receiving a termination notice for a spot instance, the failover module 250 performs a scheduling check to determine if the affected pods can be migrated to other spot nodes or if standby capacity must be used. In response to determining that migration to a spot node is not feasible, the failover module 250 identifies the appropriate standby node by referencing the pod mapping, applies a temporary lock to reserve resources, deletes the corresponding dummy pod, and initiates the migration of the production pod. The failover module 250 ensures that all steps are executed in a deterministic and race-free manner, minimizing service disruption and maintaining workload availability. In some embodiments, the failover module 250 is also configured to log all migration events for audit and transparency purposes.

The recovery module 260 is configured to manage the process of returning workloads from standby nodes back to spot instances in response to determining that spot capacity becomes available again. The recovery module 260 coordinates the instantiation of temporary dummy pods on recovered spot nodes, such that the necessary container images are pre-pulled and resources are reserved before migration. In response to determining that the dummy pods are ready, the recovery module 260 may apply temporary locks to the spot nodes, deletes the dummy pods to free up resources, and orchestrates the migration of production pods back to their original or optimal spot locations. As such, the recovery module 260 ensures that all resource reservations and mappings are updated accordingly, and that the system returns to its preferred operational state with minimal intervention.

In some embodiments, a temporary lock may be implemented using a taint that is dynamically applied to a node for a short duration to reserve its resources for a specific operation, such as live migration or failover. When the recovery module 260 initiates the process of returning workloads from standby nodes back to spot nodes, it may first apply a temporary lock (in the form of a taint) to the target spot node. This taint prevents other pods from being scheduled onto the node during the migration window, such that the node's resources remain available and uncontested for the incoming production pod.

In response to determining that the temporary lock is in place, the recovery module 260 deletes the dummy pod that was previously occupying and reserving resources on the spot node. This action frees up the reserved compute and memory resources, making them available for the production pod that is about to be migrated. The migration process then proceeds, with the production pod being orchestrated back to its original or optimal spot node location. After the migration is complete and the production pod is running successfully, the temporary lock (taint) is removed from the node, restoring it to normal scheduling behavior and allowing other pods to be scheduled there as needed.

The rebalancing module 270 is configured to monitor resource utilization and workload distribution across both spot and standby nodes. Using data such as CPU and memory requests per pod, the rebalancing module 270 may identify imbalances or fragmentation in resource allocation and triggers migration or scaling actions as needed to optimize system performance. In some embodiments, the rebalancing module 270 employs bin-packing and scheduled rebalancing strategies, particularly for standby nodes, to minimize resource wastage and ensure that the standby pool remains as compact and efficient as possible.

Bin packing refers to a process of efficiently distributing workloads-such as dummy pods and production pods-across available nodes to minimize resource fragmentation and ensure that each node operates near its optimal capacity. Each node corresponds to a "bin." The workloads—such as pods, containers, or dummy pods—are the "items" that need to be placed into these bins. The goal of bin packing is to distribute these items across the available bins (nodes) in a way that optimizes resource utilization, minimizes fragmentation, and, in the case of aggressive bin packing, consolidates as many items as possible onto the fewest number of nodes. Additional details about bin-packing techniques are further described in U.S. patent application Ser. No. 19/094,518, filed Mar. 28, 2025, which is incorporated herein by reference in its entirety.

In some embodiments, for standby nodes, the system applies more aggressive bin packing techniques, consolidating dummy pods onto the fewer possible nodes without risking availability, since these pods do not perform active work and can be tightly grouped. In some embodiments, scheduled rebalancing routines may be executed at regular intervals, automatically redistributing dummy pods as work-loads scale or shift, further reducing unnecessary over-provisioning and maintaining a compact standby pool. By continuously monitoring resource usage and dynamically adjusting pod placement, the bin packing strategies help the system maintain high efficiency, rapid failover readiness, and minimal standby resource requirements, all while supporting migration and high availability for workloads.

In some embodiments, the rebalancing module 270 interacts with the node template management module 210, dummy pod orchestration module 230, and standby capacity module 240 to redistribute workloads and maintain better cluster health. By proactively managing resource distribution, the rebalancing module 270 enhances the system's ability to absorb interruptions and maintain high availability.

The interface module 280 is configured to provide a point of interaction between users (e.g., administrators) and the live migration module 112. In some embodiments, the interface module 280 may offer APIs and dashboards that display key metrics such as the number of original and dummy pod replicas, resource requests, current node states, and migration events. In some embodiments, the interface module 280 may allow users to configure system parameters, monitor the status of spot and standby capacity, and receive alerts or recommendations based on risk assessments and system health checks. In some embodiments, the interface module 280 may integrate with all other modules 210-270 to present a unified and comprehensive view of the system, enabling both manual and automated interventions as needed. By providing real-time visibility and control, the interface module 280 enables users to optimize resource management, respond to events, and ensure the smooth operation of the live migration and standby pool.

FIG. 3 is a table 300 that shows mapping of various workloads and their associated dummy pod replicas within a standby pool, in accordance with one or more embodiments. The columns of the table 300 represent original workload name, a number of original replicas, a number of dummy pod replicas (calculated as 10% of the original replicas and rounded up), and resource requests for each pod, including CPU and memory. The rows represent different services, such as Nginx, Backend Service A, Backend Service B, Redis Service, and Postgres Service. In some embodiments, these mappings between the production pods and dummy pods may be maintained as annotations, such that the system can quickly identify and promote the correct dummy pod during a failover event.

The table 300 shows how a small number of "dummy" pods (10%) are pre-provisioned for each workload, based on a percentage of the original replica count. For example, when the original workload includes 20 replicas, 2 (10% of 20) dummy pod replicas are pre-provisioned. For situations where 10% of workload is fewer than 1 pod, the system rounds up the dummy pod count to 1. By rounding up the dummy pod count, the system guarantees that even workloads with a small number of replicas, such as database services, have at least one standby pod available.

Each dummy pod is associated with a specific CPU request and memory request based on their corresponding product pod's CPU request and memory request. In some embodiments, the system can determine a total number of CPU cores and amount of memory is required for the standby pool by summing the resource requests of each dummy pod.

In some embodiments, the system may assess the resource requirements for each production pod and calculate the total number of CPU cores and the total memory needed for all production pods operating on spot instances (also referred to as the primary pool). Using this assessment, the system can configure the standby pool to include a predetermined percentage of the total CPU cores and memory identified for the primary pool. For instance, the primary pool may be allocated 41.5 CPU cores and 88 GiB of memory, while the standby pool may be set up with 5.25 CPU cores and 9.25 GiB of memory, corresponding to a predetermined fraction of the overall resource requirements.

Figure 4A:
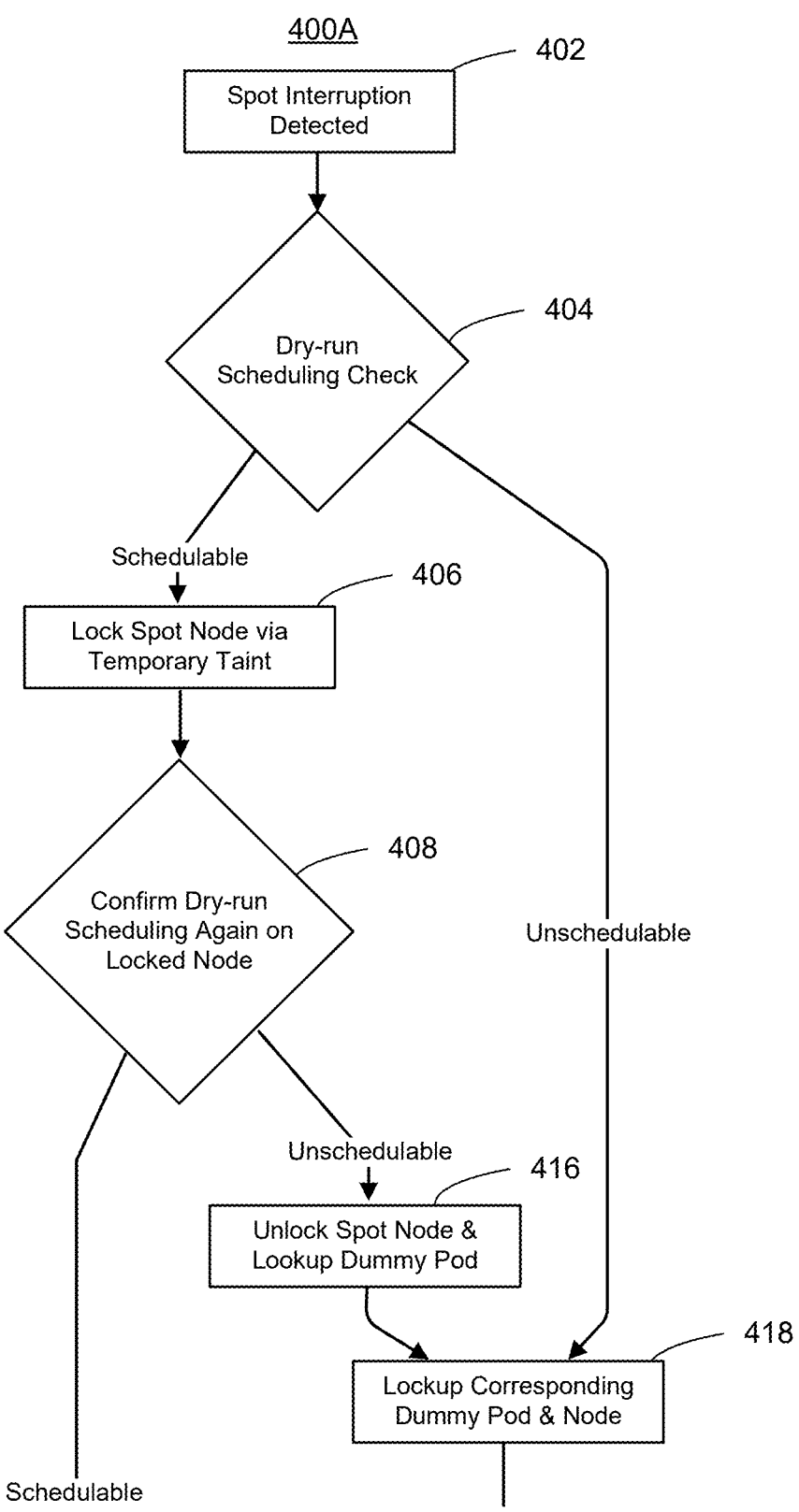
FIGS. 4A-4B is a flow diagram illustrating an example workload journey, in accordance with one or more embodiments.
Figure 4B:
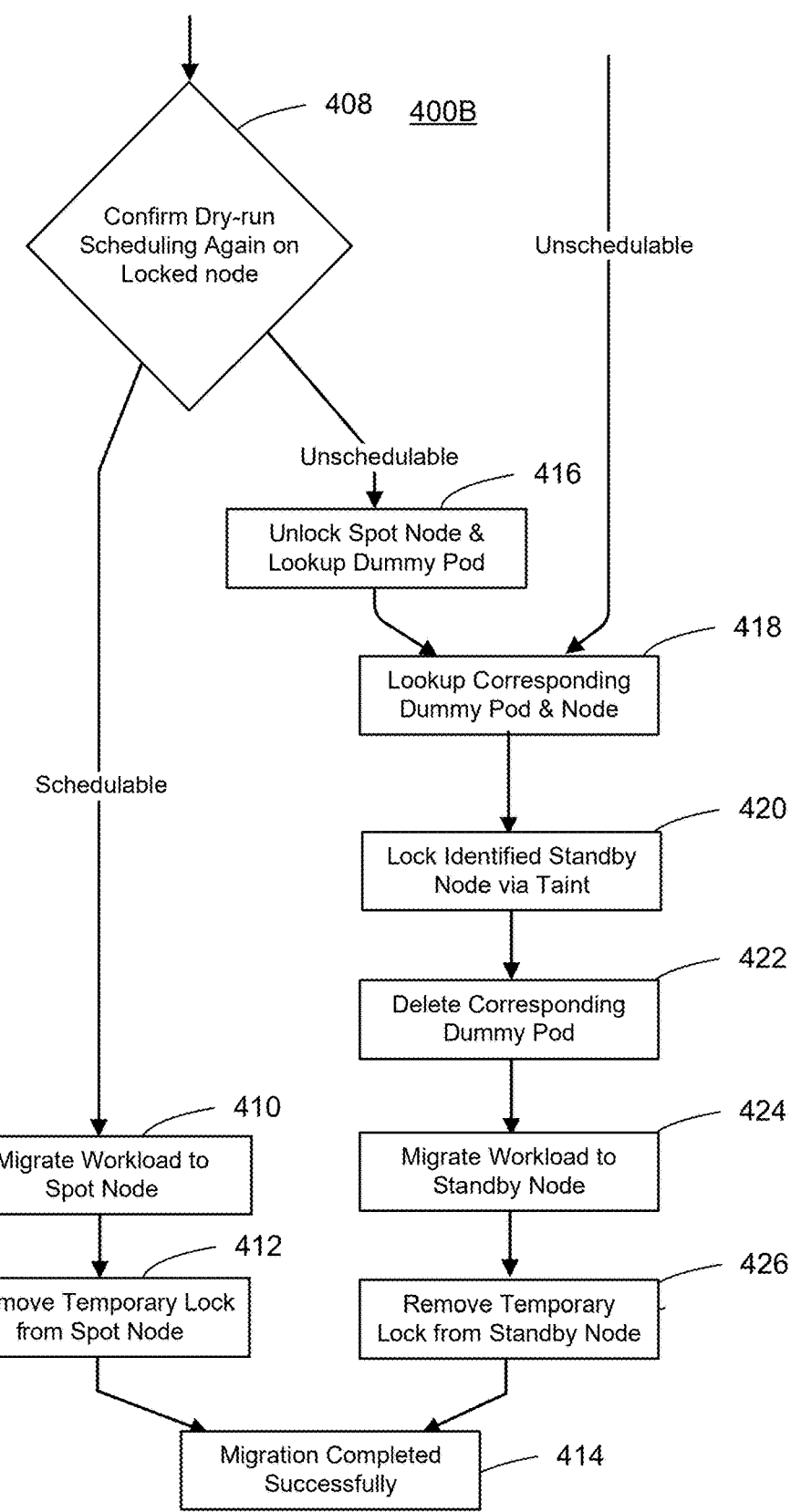

FIGS. 4A-4B is a flow diagram 400A-400B illustrating an example workload journey, in accordance with one or more embodiments. The workload journey begins when a spot interruption is detected (step 402). The system first conducts a dry-run scheduling evaluation (step 404) to determine whether the affected workload can be rescheduled onto another spot node. A dry-run scheduling evaluation is a process used by a cluster management system, such as Kubernetes, to simulate the placement of a workload (e.g., a pod) on a node without actually performing the scheduling action. During this evaluation, the system checks whether the target node has sufficient available resources (such as CPU and memory) and meets all required constraints (such as affinity, anti-affinity, and topology spread rules) to accommodate the workload. The result of a dry-run scheduling evaluation indicates whether the workload could be successfully scheduled on the node if the operation were to proceed, but no changes are made to the actual cluster state during this simulation.

In response to determining that the workload is schedulable, the system applies a temporary lock (step 406) to the target spot node to prevent other workloads from being scheduled during the migration process. A second dry-run scheduling evaluation is then performed (step 408) on the locked node to confirm that it remains a viable migration target. In response to successful check, the workload is migrated to the spot node (step 408), the temporary lock is removed (step 412), and the migration is completed successfully (step 414).

Alternatively, in response to determining that the second schedulability check (step 406) fails, the system releases the temporary lock (step 416) on the spot node and proceeds to identify a corresponding dummy pod (step 418), which serves as a placeholder for potential migration targets within the standby pool. The system locates the appropriate dummy pod and its associated standby node, applies a temporary lock (step 420) to the standby node, and deletes (step 422) the dummy pod to free up the reserved resources. The workload is then migrated (step 424) to the standby node, after which the temporary lock is removed (step 426) and the migration process is marked as complete (step 414).

Alternatively, in response to determining that the first schedulability check (step 404) fails, the system also performs the steps 418, 420, 422, 424, and 426, which also lead to the complete migration process (step 414).

Following the migration, the system monitors the availability of spot capacity. In response to determining that spot resources have become available again, the system attempts to reclaim the spot instance and migrate the workload back from the on-demand node to the spot instance. This approach enables the system to maintain high spot instance utilization. By promptly returning workloads to spot instances when they become available, the system reduces reliance on on-demand resources, thereby improving overall resource efficiency. Furthermore, this dynamic migration strategy allows the system to flexibly adapt to fluctuations in resource availability, ensuring that workloads are executed on the most suitable infrastructure without compromising service reliability or performance. As a result, the system achieves an optimal balance between resource utilization and workload continuity, leveraging the advantages of spot capacity while mitigating the risks associated with spot interruptions.

Figure 5:
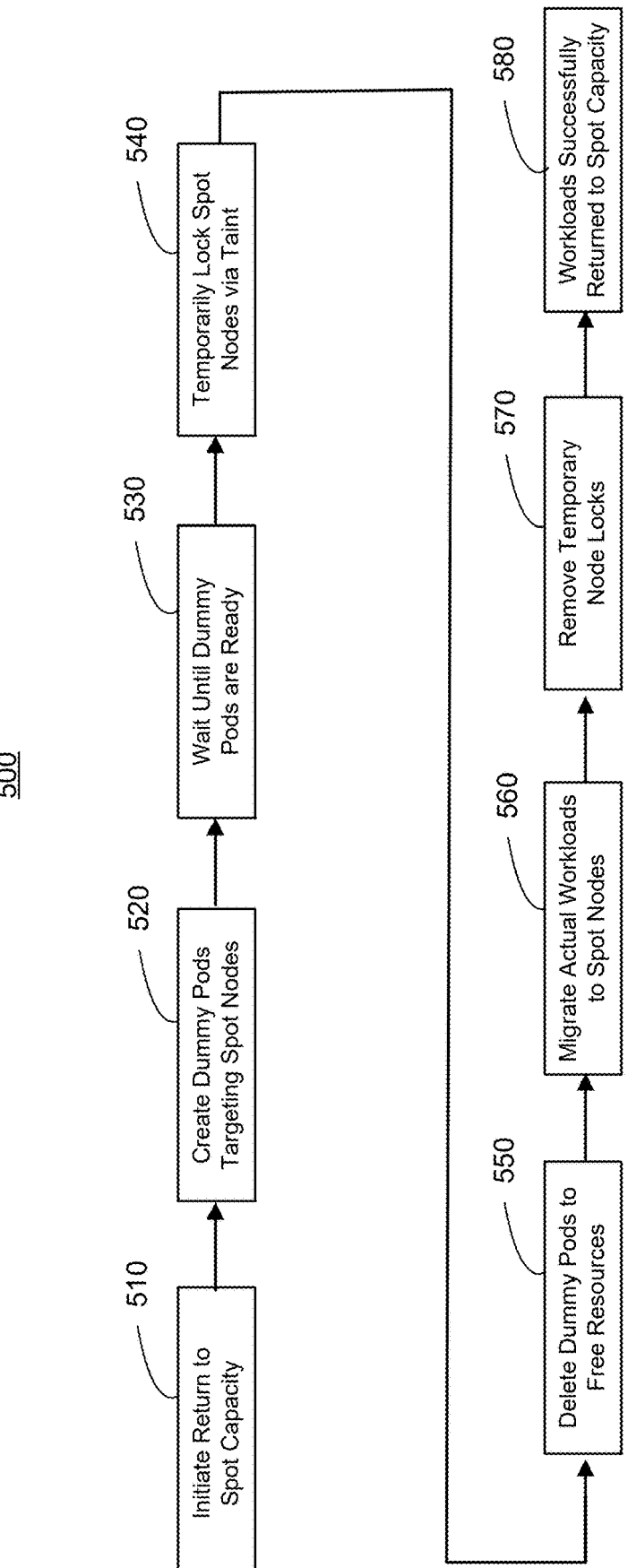
FIG. 5 is a flowchart illustrating a process for returning workloads to spot capacity, in accordance with one or more embodiments.

FIG. 5 is a flowchart illustrating a process 500 for returning workloads to spot capacity, in accordance with one or more embodiments. The process 500 begins with an initiation of the return to spot capacity (step 510), followed by a creation of dummy pods targeting the spot nodes (step 520). The system then waits until these dummy pods are ready (step 530), ensuring that the spot nodes have pre-pulled the necessary container images and reserved the required resources. Next, the spot nodes are temporarily locked (step 540) to prevent other workloads from being scheduled during the migration process. In response to deleting the dummy pods to free up resources (step 550), the actual workloads are migrated from the standby pool to the spot nodes (step 560). After migration, the temporary node locks are removed (step 570), and the process concludes with confirmation that the workloads have successfully returned to spot capacity (step 580).

Figure 6:
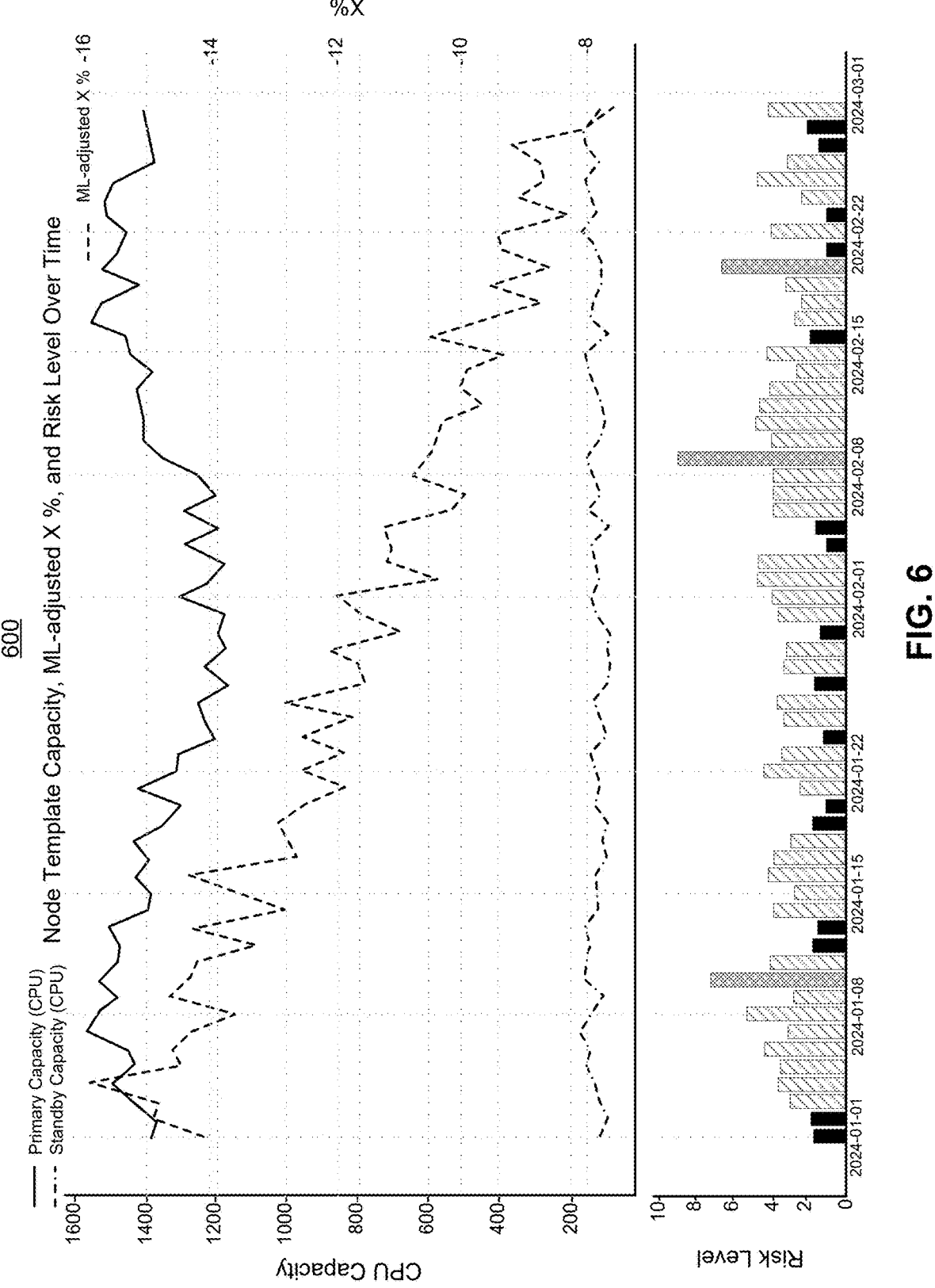
FIG. 6 is a chart illustrating a visualization of resource management and risk assessment, in accordance with one or more embodiments.

FIG. 6 is a chart 600 illustrating a visualization of resource management and risk assessment, in accordance with one or more embodiments. The chart 600 includes three data series: primary capacity (CPU), representing the available CPU resources allocated to active (spot) nodes; standby capacity (CPU), indicating the CPU resources reserved in the standby (on-demand) pool; and machine-learning (ML) adjusted X %, which reflects a machine learning derived metric that dynamically adjusts or predicts the percentage of standby resources require based on historical and real-time data. The x-axis spans a date range from "2024-01-01" to "2024-03-01," while the left y-axis quantifies CPU capacity and the right y-axis measures the X % value. Below the line chart, a bar graph displays bars, corresponding to varying levels of system risk over the same time period. High-risk intervals, indicated by red bars, align with specific dates where capacity may be insufficient or demand is elevated. Example Methods for Live Migration with Mirrored Standby Pool and Dummy Pods FIG. 7 is a flowchart of a method 700 for live migration with mirrored standby pool and dummy pods, in accordance with one or more embodiments. In various embodiments, the method includes different or additional steps than those described in conjunction with FIG. 7. Further, in some embodiments, the steps of the method may be performed in different orders than the order described in conjunction with FIG. 7. The method described in conjunction with FIG. 7 may be carried out by the automation system 110 in various embodiments, while in other embodiments, the steps of the method are performed by any online system capable of performing these steps.

The automation system 110 provisions 710 a plurality of spot instances based on corresponding node templates. In this process, the system utilizes predefined node templates that specify the desired configuration for each node, including parameters such as CPU, memory, storage, and network settings. For each node template, the system requests the creation of one or more spot instances from the cloud provider. Spot instances are virtual machines offered at a lower priority and are subject to interruption by the provider, making them suitable for flexible workloads. The automation system 110 ensures that the spot instances are provisioned in accordance with the resource requirements and scheduling constraints defined in the node templates. This provisioning and template alignment is managed by the node template management module 210. This provisioning process is dynamic and can scale up or down in response to workload demand, cluster scaling events, or changes in application requirements. By leveraging node templates, the system maintains consistency and repeatability in the deployment of spot instances across the cluster.

The automation system 110 instantiates 720 a plurality of production workloads on the plurality of spot instances. In response to provisioning the spot instances, the system 110 schedules and deploys production workloads—containerized application workloads—onto these instances. Each production workload is configured according to its specific resource requirements, such as CPU, memory, and storage, as well as any affinity or anti-affinity rules that govern its placement within the cluster. The automation system 110 manages the lifecycle of these workloads, ensuring that they are started, monitored, and maintained in a healthy state on the spot instances. If a workload fails or is evicted, the system can automatically reschedule it onto another suitable spot instance. These workload management functions may be coordinated by the dummy pod orchestration module 230 in collaboration with the node template management module 210. This orchestration enables efficient utilization of spot resources, supports high availability, and allows for rapid scaling of application workloads in response to changing demand. The system's automated management of production workloads on spot instances is advantageous for maintaining operational continuity and resource efficiency.

The automation system 110 generates 730, for each node template, a standby node template that mirrors a corresponding node template. This process involves creating a duplicate or mirrored version of each primary node template used for spot instances, but configured to provision on-demand instances instead. The standby node template retains all the configuration details of the original, including resource specifications, scheduling constraints, and network settings, ensuring that any workload running on a spot instance can be migrated to a standby node if needed. The system 110 may also apply additional attributes, such as temporary locks or scheduling restrictions, to the standby node template to prevent unintended workloads from being scheduled there. These actions may be performed by the node template management module 210, which is responsible for maintaining and locking standby templates. By maintaining mirrored standby node templates, the automation system 110 enables rapid failover and recovery, as standby nodes can be provisioned and made ready to accept production workloads at a moment's notice, thereby enhancing the resilience and reliability of the overall system.

The automation system 110 provisions 740 on-demand instances as standby instances based on corresponding standby node templates. Using the mirrored standby node templates generated for each primary node template, the system requests the creation of on-demand instances from the cloud provider. On-demand instances are virtual machines that are not subject to interruption and provide predictable availability, making them ideal for serving as standby resources. The automation system 110 ensures that these on-demand instances are provisioned with the same resource specifications and configuration as their corresponding spot instances, allowing for migration of workloads in the event of a spot interruption. The system may dynamically adjust the number of standby instances based on real-time demand, predictive analytics, or risk assessments. These provisioning actions may be carried out by the standby capacity module 240, which determines the required standby resource levels. By maintaining a pool of ready-touse standby instances, the automation system 110 ensures that workloads can be rapidly and reliably migrated, minimizing downtime and supporting high availability.

The automation system 110 instantiates 750 a plurality of dummy pods on the on-demand instances, each dummy pod pre-pulling the container image and reserving compute resources for a corresponding production pod. Dummy pods are lightweight, non-functional placeholders that mirror the resource requirements and scheduling constraints of actual production pods. When instantiated on standby (on-demand) instances, each dummy pod pre-pulls the container image required by its corresponding production pod, ensuring that the image is cached and ready for immediate use. Additionally, the dummy pod reserves the necessary CPU and memory resources on the standby node, guaranteeing that sufficient capacity is available for rapid migration. This instantiation process may be handled by the dummy pod orchestration module 230, which manages the lifecycle and resource reservation for all dummy pods. The automation system 110 manages the lifecycle of these dummy pods, creating, updating, or deleting them as needed to reflect changes in the production workload. This approach eliminates delays associated with image pulls and resource allocation during failover, enabling efficient migration of production pods to standby nodes.

The automation system 110 monitors 760 the spot instances to detect interruptions. In some embodiments, the system continuously monitors the status and health of all spot instances within a cluster, utilizing cloud provider notifications, internal health checks, and predictive analytics to identify potential interruptions. When a spot instance is scheduled for termination or becomes otherwise unavailable, the automation system 110 promptly detects this event and initiates a series of actions to preserve workload continuity. The detection process may include evaluating the reason for interruption, the affected workloads, and the available resources for migration. These monitoring and detection functions may be performed by the failover module 250, which is responsible for spotting interruption events and coordinating the subsequent migration workflow. By promptly identifying spot instance interruptions, the system can trigger failover procedures, such as mapping production workloads to standby resources and orchestrating live migration, thereby minimizing service disruption and maintaining high availability for applications.

In response to detecting an interruption of a spot instance, the automation system 110 identifies 770 a dummy workload on a standby node corresponding to the production workload on the interrupted spot instance. In some embodiments, the system first determines which production workload was running on the interrupted spot instance and then consults its internal mapping of production workloads to dummy workloads. This mapping is maintained as part of the standby pool management and ensures that each production workload has a designated dummy workload on a standby node that mirrors its resource requirements and scheduling constraints. The automation system 110 then identifies the specific dummy workload on a standby node that corresponds to the interrupted production workload. This mapping and identification process may be performed by the pod mapping module 220, which maintains the relationships between production and dummy pods. This dummy workload has already pre-pulled the necessary container image and reserved the required compute resources, such that the standby node is ready to accept the production workload without delay. By efficiently identifying and targeting the appropriate dummy workload, the system streamlines the migration process, minimizes downtime, and supports high availability for applications.

The automation system 110 migrates 780 the production workload to the standby node. After mapping the production workload to its corresponding dummy workload and preparing the standby node, the system orchestrates the migration process. This may involve live migration, where the running state, memory, and network connections of the production workload are transferred to the standby node with minimal disruption, or it may involve eviction and restart, depending on workload requirements. The system ensures that the migration is performed atomically, applying temporary locks to the standby node to prevent other workloads from interfering during the transition. The failover module 250 may be responsible for orchestrating this migration, applying temporary locks, and ensuring atomic execution of the transition. Once the migration is complete, the production workload resumes operation on the standby node, and the system updates its internal records to reflect the new placement. This automated migration process is for maintaining service continuity and minimizing downtime during spot instance interruptions.

Later, the automation system 110 may attempt to recover a spot instance. Following a spot instance interruption and the migration of affected workloads to standby nodes, the system continuously monitors the availability of spot capacity within the cloud environment. When spot resources become available again, the automation system 110 initiates recovery procedures to reclaim and re-provision spot instances based on the original node templates. This may involve requesting new spot instances from the cloud provider, verifying their readiness, and preparing them for workload migration. The system evaluates the suitability of recovered spot instances for hosting production workloads, taking into account resource availability, scheduling constraints, and current cluster state. The recovery module 260 may perform these recovery procedures, including monitoring spot capacity and determining suitability for return migration. By proactively attempting to recover spot instances, the automation system 110 enables the efficient return of workloads to lower-priority, flexible resources, optimizing resource utilization and maintaining operational efficiency.

In response to recovering the spot instance, the automation system 110 instantiates a dummy workload on the recovered spot instance. This step involves creating a new dummy workload on the newly available spot node, mirroring the resource requirements and container image of the production workload that was previously migrated to a standby node. The dummy workload pre-pulls the necessary container image and reserves the required compute resources, ensuring that the spot node is fully prepared to accept the production workload. The system 110 waits until the dummy workload is ready, confirming that all prerequisites for migration are satisfied. This operation may be coordinated by the recovery module 260 in conjunction with the dummy pod orchestration module 230. This proactive preparation eliminates delays associated with image pulls and resource allocation, enabling a rapid migration of the production workload back to the spot instance. The automation system 110 manages the lifecycle of these dummy workloads, creating or deleting them as needed to support efficient workload transitions.

The automation system 110 may then migrate the production workload on the on-demand instance back to the spot instance. Once the recovered spot instance is prepared and the dummy workload has reserved the necessary resources, the system orchestrates the migration of the production workload from the standby (on-demand) node back to the spot node. This migration may be performed as a live migration, transferring the running state and network connections with minimal disruption, or as a restart, depending on the workload's requirements. The system 110 applies temporary locks to the spot node during migration to prevent scheduling conflicts and ensure atomicity. These tasks may be executed by the recovery module 260, which manages the migration back to spot capacity and removal of locks post-migration. After the migration is complete, the temporary locks are removed, and the production workload resumes normal operation on the spot instance. The automation system 110 updates its internal records to reflect the new placement, maintaining an accurate view of resource allocation and supporting ongoing operational efficiency and high availability.

Example Computing System

Figure 8:
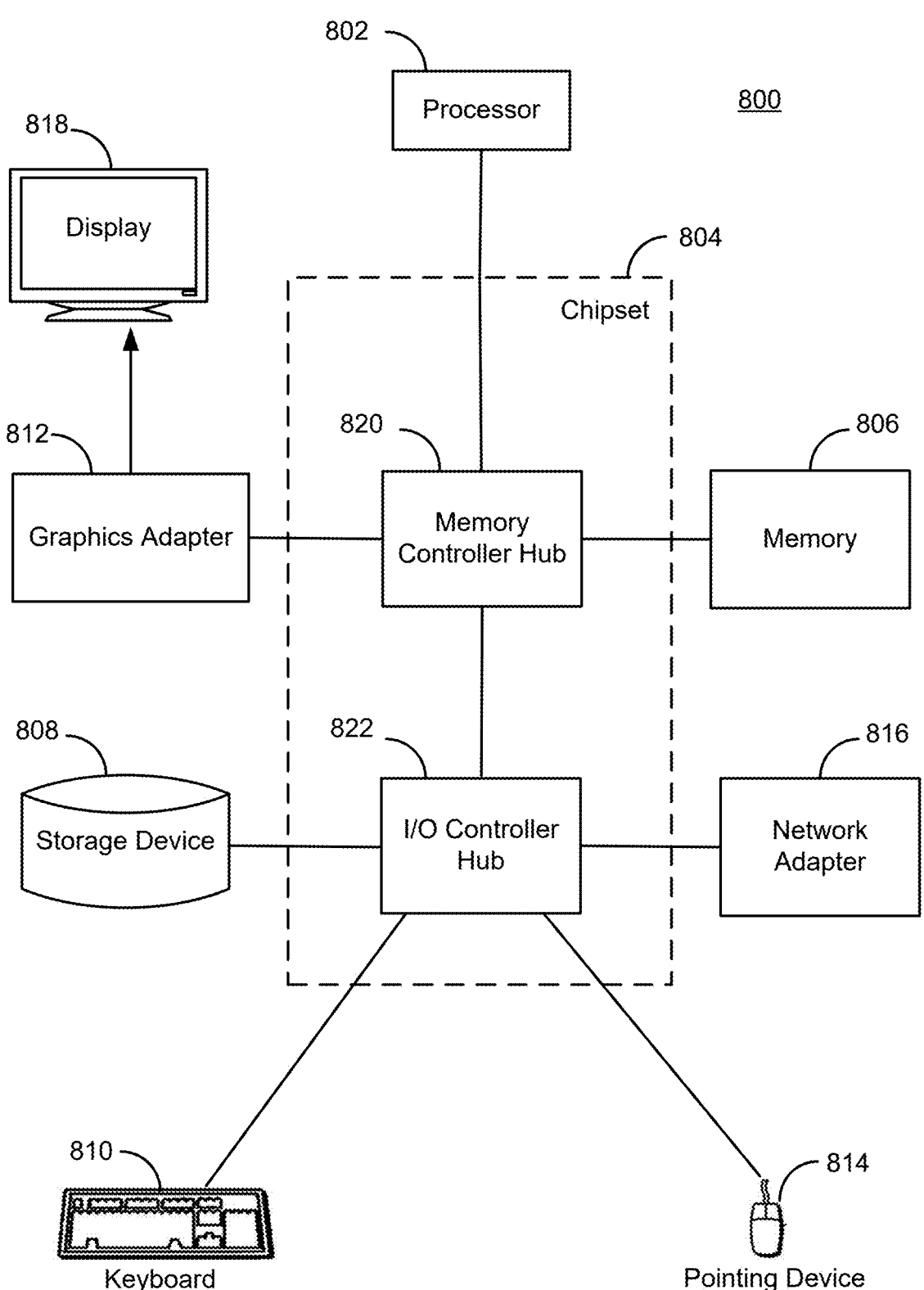
FIG. 8 is a block diagram of an example computer suitable for use in a networked computing environment in accordance with one or more embodiments.

FIG. 8 is a block diagram of an example computer 800 suitable for use in the networked computing environment 100 of FIG. 1. The computer 800 is a computer system and is configured to perform specific functions as described herein. For example, the specific functions corresponding to automation system 110 may be configured through the computer 800.

The example computer 800 includes a processor system having one or more processors 802 coupled to a chipset 804. The chipset 804 includes a memory controller hub 820 and an input/output (I/O) controller hub 822. A memory system having one or more memories 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touchscreen, or other types of a pointing device and may be used in combination with the keyboard 810 (which may be an on-screen keyboard) to input data into the computer 800. The graphics adapter 812 displays images and other information on the display 818. The network adapter 816 couples the computer 800 to one or more computer networks, such as network 150.

The types of computers used by the entities and the automation system 110 of FIGS. 1 through 8 can vary depending upon the embodiment and the processing power required by the enterprise. For example, the automation system 110 might include multiple blade servers working together to provide the functionality described. Furthermore, the computers can lack some of the components described above, such as keyboards 810, graphics adapters 812, and displays 818.

Additional Considerations

The disclosed embodiments provide several technical effects in the management of containerized workloads within cloud environments. By maintaining a minimal, pre-provisioned pool of standby on-demand nodes and leveraging dummy workloads that reserve resources and pre-pull container images, the system enables rapid, automated failover in response to spot instance interruptions.

This approach eliminates delays associated with node provisioning and image pulls, ensuring that production workloads can be migrated seamlessly and with minimal disruption. The use of temporary locks and deterministic mapping between production and dummy workloads prevents race conditions and guarantees atomic migration, thereby enhancing reliability and operational continuity. Furthermore, the system's aggressive bin-packing and continuous rebalancing strategies optimize resource utilization, reducing unnecessary over-provisioning and fragmentation of standby nodes. The integration of predictive models for dynamically adjusting standby pool size further ensures that only the minimum necessary resources are held in reserve. Collectively, these technical effects result in improved availability, efficiency, and scalability for cloud-native applications.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for maintaining availability of production workloads during interruption of cloud spot instances, comprising:

provisioning a plurality of spot instances based on corresponding node templates, wherein each of the plurality of spot instances is a virtual machine provisioned from a cloud provider, and is subject to interruption by the cloud provider based on dynamic capacity condition at the cloud provider;

instantiating a plurality of production workloads on the plurality of spot instances;

generating, for each node template, a standby node template that mirrors a corresponding node template;

provisioning one or more on-demand instances as standby instances based on corresponding standby node templates, wherein each of the one or more on-demand instances is a virtual machine provisioned from the cloud provider, and is not subject to interruption by the cloud provider based on dynamic capacity condition at the cloud provider;

instantiating a plurality of dummy workloads on the on-demand instances, each dummy workload pre-pulling a container image and reserving compute resources for a corresponding production workload;

monitoring the plurality of spot instances to detect interruptions;

in response to detecting an interruption of a spot instance that runs a production workload:

identifying a dummy workload on a standby node that corresponds to the production workload on the interrupted spot instance, applying a temporary lock to the standby node to prevent other workloads from being scheduled on the standby node during migration, and migrating the production workload to the standby node.

2. The method of claim 1, the method further comprising:

attempting to provision, in accordance with the node template of the interrupted spot instance, a replacement spot instance;

in response to successfully provisioning the replacement spot instance, instantiating, on the replacement spot instance, a second dummy workload that pre-pulls a container image and reserves compute resources for the production workload; and migrating the production workload from the on-demand instance back to the replacement spot instance.

3. The method of claim 1, wherein each dummy workload mirrors resource requests and scheduling constraints of a corresponding production workload, including at least one of CPU, memory, anti-affinity, or topology spread constraints.

4. The method of claim 1, wherein the standby node template includes a temporary lock to prevent other workloads from being scheduled on the standby instances.

5. The method of claim 4, the method further comprising:

after migrating the production workload to the standby node, removing the temporary lock from the standby node to restore normal scheduling behavior.

6. The method of claim 1, the method further comprising:

determining a percentage of standby capacity to provision based on at least one of workload interruption sensitivity, historical utilization, or prediction models.

7. The method of claim 6, wherein the percentage of standby capacity is dynamically adjusted by a machine learning model trained on historical spot instance interruptions, resource utilization metrics, workload scaling events, and risk indicators.

8. The method of claim 1, the method further comprising:

in response to detecting an interruption of a spot instance that runs a production workload, performing a scheduling evaluation to determine whether a production workload can be migrated to another spot node before migrating to a standby instance.

9. The method of claim 1, wherein the migration of the production workload to the standby node comprises deleting the corresponding dummy workload to free up reserved resources prior to migration.

10. The method of claim 1, the method further comprising:

monitoring resource utilization across the spot instances and on-demand instances, and in response to detecting imbalance in resource utilization among the spot instances and on-demand instances, triggering migration of a workload from a first instance to another instance.

11. A non-transitory computer readable storage medium having instructions encoded thereon that, when executed by one or more processors, cause the one or more processors to perform steps comprising:

provisioning a plurality of spot instances based on corresponding node templates, wherein each of the plurality of spot instances is a virtual machine provisioned from a cloud provider, and is subject to interruption by the cloud provider based on dynamic capacity condition at the cloud provider;

instantiating a plurality of production workloads on the plurality of spot instances;

generating, for each node template, a standby node template that mirrors a corresponding node template;

provisioning one or more on-demand instances as standby instances based on corresponding standby node templates, wherein each of the one or more on-demand instances is a virtual machine provisioned from the cloud provider, and is not subject to interruption by the cloud provider based on dynamic capacity condition at the cloud provider;

instantiating a plurality of dummy workloads on the on-demand instances, each dummy workload pre-pulling a container image and reserving compute resources for a corresponding production workload;

monitoring the plurality of spot instances to detect interruptions;

in response to detecting an interruption of a spot instance that runs a production workload:

identifying a dummy workload on a standby node that corresponds to the production workload on the interrupted spot instance, applying a temporary lock to the standby node to prevent other workloads from being scheduled on the standby node during migration, and migrating the production workload to the standby node.

12. The non-transitory computer readable storage medium of claim 11, the steps further comprising:

attempting to provision, in accordance with the node template of the interrupted spot instance, a replacement spot instance;

in response to successfully provisioning the replacement spot instance, instantiating, on the replacement spot instance, a second dummy workload that pre-pulls a container image and reserves compute resources for the production workload; and migrating the production workload from the on-demand instance back to the replacement spot instance.

13. The non-transitory computer readable storage medium of claim 11, wherein each dummy workload mirrors resource requests and scheduling constraints of a corresponding production workload, including at least one of CPU, memory, anti-affinity, or topology spread constraints.

14. The non-transitory computer readable storage medium of claim 11, wherein the standby node template includes a temporary lock to prevent other workloads from being scheduled on the standby instances.

15. The non-transitory computer readable storage medium of claim 14, the steps further comprising:

after migrating the production workload to the standby node, removing the temporary lock from the standby node to restore normal scheduling behavior.

16. The non-transitory computer readable storage medium of claim 11, the steps further comprising:

determining a percentage of standby capacity to provision based on at least one of workload interruption sensitivity, historical utilization, or prediction models.

17. The non-transitory computer readable storage medium of claim 16, wherein the percentage of standby capacity is dynamically adjusted by a machine learning model trained on historical spot instance interruptions, resource utilization metrics, workload scaling events, and risk indicators.

18. The non-transitory computer readable storage medium of claim 11, the steps further comprising:

in response to detecting an interruption of a spot instance that runs a production workload, performing a scheduling evaluation to determine whether a production workload can be migrated to another spot node before migrating to a standby instance.

19. The non-transitory computer readable storage medium of claim 11, wherein the migration of the production workload to the standby node comprises deleting the corresponding dummy workload to free up reserved resources prior to migration.

20. A system, comprising:

one or more processors; and a non-transitory computer readable storage medium having instructions encoded thereon that, when executed by the one or more processors, cause the one or more processors to perform steps comprising:

provisioning a plurality of spot instances based on corresponding node templates, wherein each of the plurality of spot instances is a virtual machine provisioned from a cloud provider, and is subject to interruption by the cloud provider based on dynamic capacity condition at the cloud provider;

instantiating a plurality of production workloads on the plurality of spot instances;

generating, for each node template, a standby node template that mirrors a corresponding node template;

provisioning one or more on-demand instances as standby instances based on corresponding standby node templates, wherein each of the one or more on-demand instances is a virtual machine provisioned from the cloud provider, and is not subject to interruption by the cloud provider based on dynamic capacity condition at the cloud provider;

instantiating a plurality of dummy workloads on the on-demand instances, each dummy workload pre-pulling a container image and reserving compute resources for a corresponding production workload;

monitoring the plurality of spot instances to detect interruptions;

in response to detecting an interruption of a spot instance that runs a production workload:

identifying a dummy workload on a standby node that corresponds to the production workload on the interrupted spot instance, applying a temporary lock to the standby node to prevent other workloads from being scheduled on the standby node during migration, and migrating the production workload to the standby node.

* * * * *